(12) United States Patent
Nishii

(10) Patent No.: US 12,187,337 B2
(45) Date of Patent: Jan. 7, 2025

(54) CONVEYANCE SYSTEM AND CONVEYANCE METHOD

(71) Applicant: TOYOTA JIDOSHA KABUSHIKI KAISHA, Toyota (JP)

(72) Inventor: Kazutoshi Nishii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 479 days.

(21) Appl. No.: 17/705,958

(22) Filed: Mar. 28, 2022

(65) Prior Publication Data

US 2022/0315084 A1 Oct. 6, 2022

(30) Foreign Application Priority Data

Apr. 2, 2021 (JP) .................. 2021-063250

(51) Int. Cl.
*B62B 3/04* (2006.01)
*B62B 3/10* (2006.01)
*B65G 67/02* (2006.01)
*B65G 69/00* (2006.01)

(52) U.S. Cl.
CPC .................. *B62B 3/04* (2013.01); *B62B 3/10* (2013.01); *B65G 67/02* (2013.01); *B65G 69/003* (2013.01)

(58) Field of Classification Search
None
See application file for complete search history.

(56) References Cited

U.S. PATENT DOCUMENTS

| 4,508,484 | A | * | 4/1985 | Heiz | B65G 47/61 |
| | | | | | 414/337 |
| 4,930,967 | A | * | 6/1990 | Dovidauskas | B66F 7/243 |
| | | | | | 414/373 |
| 5,037,265 | A | * | 8/1991 | O'Brien | B65G 69/30 |
| | | | | | 414/373 |
| 9,517,899 | B2 | * | 12/2016 | Watt | B65G 67/26 |
| 2009/0265031 | A1 | | 10/2009 | Tachibana et al. | |

FOREIGN PATENT DOCUMENTS

JP 5051855 B2 10/2012

* cited by examiner

*Primary Examiner* — Mark C Hageman
(74) *Attorney, Agent, or Firm* — Dinsmore & Shohl LLP

(57) ABSTRACT

A conveyance system and a conveyance method capable of efficiently delivering/receiving containers between an AGV and a cart are provided. A conveyance system according to an aspect of the present disclosure includes an AGV configured to convey a plurality of containers, a cart configured to support the containers, and two platforms each of which includes a ramp on which the cart travels. The cart is further configured to, by a force applied from the AGV, climb up the ramp, and lift and support the containers placed on the AGV.

12 Claims, 27 Drawing Sheets

CONVEYANCE SYSTEM AND CONVEYANCE METHOD

CROSS REFERENCE TO RELATED APPLICATIONS

This application is based upon and claims the benefit of priority from Japanese patent application No. 2021-063250, filed on Apr. 2, 2021, the disclosure of which is incorporated herein in its entirety by reference.

BACKGROUND

The present disclosure relates to a conveyance system and a conveyance method for conveying an object.

In production lines of vehicles such as automobiles, delivering/receiving objects by AGVs (Automatic Guided Vehicles) has conventionally been conducted. As an example of such a technology, Japanese Patent No. 5051855 discloses an automated warehouse including a warehouse unit including a plurality of carts arranged in an orderly fashion, and an AGV that delivers/receives an article to/from these carts.

SUMMARY

However, the automated warehouse disclosed in the aforementioned publication has a problem that a plurality of containers containing objects to be delivered cannot be simultaneously delivered/received between the AGV and the cart.

The present disclosure provides a conveyance system and a conveyance method capable of efficiently delivering/receiving the containers between an AGV and a cart.

A first exemplary aspect is a conveyance system including:

an AGV (Automatic Guided Vehicle) configured to convey a plurality of containers;

at least one cart configured to support the containers; and two platforms each of which includes at least one ramp on which the cart travels, in which the cart is further configured to, by a force applied from the AGV, climb up the ramp, and lift and support the containers placed on the AGV.

The cart may include a support part configured to support a lateral end of the containers, each of the platforms may include a lower-side surface continuous with a lower end of the ramp, and a height of the ramp may be larger than a distance between a lower surface of the lateral end of the containers placed on the AGV and a corresponding support part of the cart disposed on the lower-side surface.

The cart may include a placement surface on which the containers is disposed, each of the platforms may include a lower-side surface continuous with a lower end of the ramp, and a height of the ramp may be larger than a distance between a lower surface of the containers supported by the AGV and a corresponding placement surface of the cart disposed on the lower-side surface.

Each of the platforms may include an upper-side surface continuous with an upper end of the ramp, and a length of the upper-side surface in a direction in which the AGV and the cart move may be equal to or longer than a sum of a braking distance of the AGV and an error in a stopping position of the AGV.

The AGV may include a first engagement part, the cart may include a second engagement part corresponding to the first engagement part of the AGV, each of the platforms may include an upper-side surface continuous with an upper end of the ramp, the first and second engagement parts may be configured to engage with each other in a state in which the cart is disposed on the upper-side surface, and the AGV may be able to move the cart supporting the containers from the upper-side surface to the ramp by applying a force to the cart through engagement of the first and second engagement parts, and thereby to collect the containers from the cart.

A plurality of carts may be arranged on each of the platforms.

Each of the platforms may be configured so that the carts can move in a direction perpendicular to a direction in which the carts are arranged.

Each of the platforms may include: A lower-side surface corresponding to an upper surface of each of the platforms;

a first ramp continuous with the lower-side surface and extending upward therefrom;

an upper-side surface continuous with an upper end of the first ramp; and a second ramp continuous with the upper-side surface and extending downward therefrom, and the plurality of carts may be arranged on the second ramp.

The conveyance system may further include a stopper configured to restrict movements of the carts arranged on each of the platforms.

The cart may include a first guide by which a central axis of the cart is aligned with a central axis of the AGV in a longitudinal direction of the platforms.

The conveyance system may further include a second guide by which a central axis of the cart in the longitudinal direction of the platforms is aligned with a central axis of the platforms in a longitudinal direction thereof located between two platforms.

The Cart May Include:

a first pair of wheels;

a second pair of wheels; and a vertical support part configured to support the support part supporting the lateral end of the containers on a side of the cart on which the first pair of wheels is disposed, and each of the platforms may include a first upper-side surface continuous with an upper end of the ramp on which the first pair of wheels runs, and a second upper-side surface continuous with an upper end of the ramp on which the second pair of wheels runs, and a length of the first upper-side surface of each of the platforms in a longitudinal direction thereof may be longer than a length of the second upper-side surface of each of the platforms in the longitudinal direction thereof.

Another exemplary aspect is a conveyance method performed in a conveyance system configured to convey a plurality of containers, the conveyance system including: an AGV configured to convey a plurality of containers; a cart configured to support the containers; and two platforms each of which includes at least one ramp on which the cart travels, the conveyance method including a process in which, by a force applied from the AGV, the cart climbs up the ramp, and lifts and supports the containers placed on the AGV.

According to present disclosure, it is possible to provide a conveyance system and a conveyance method capable of efficiently delivering/receiving the containers between an AGV and a cart.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
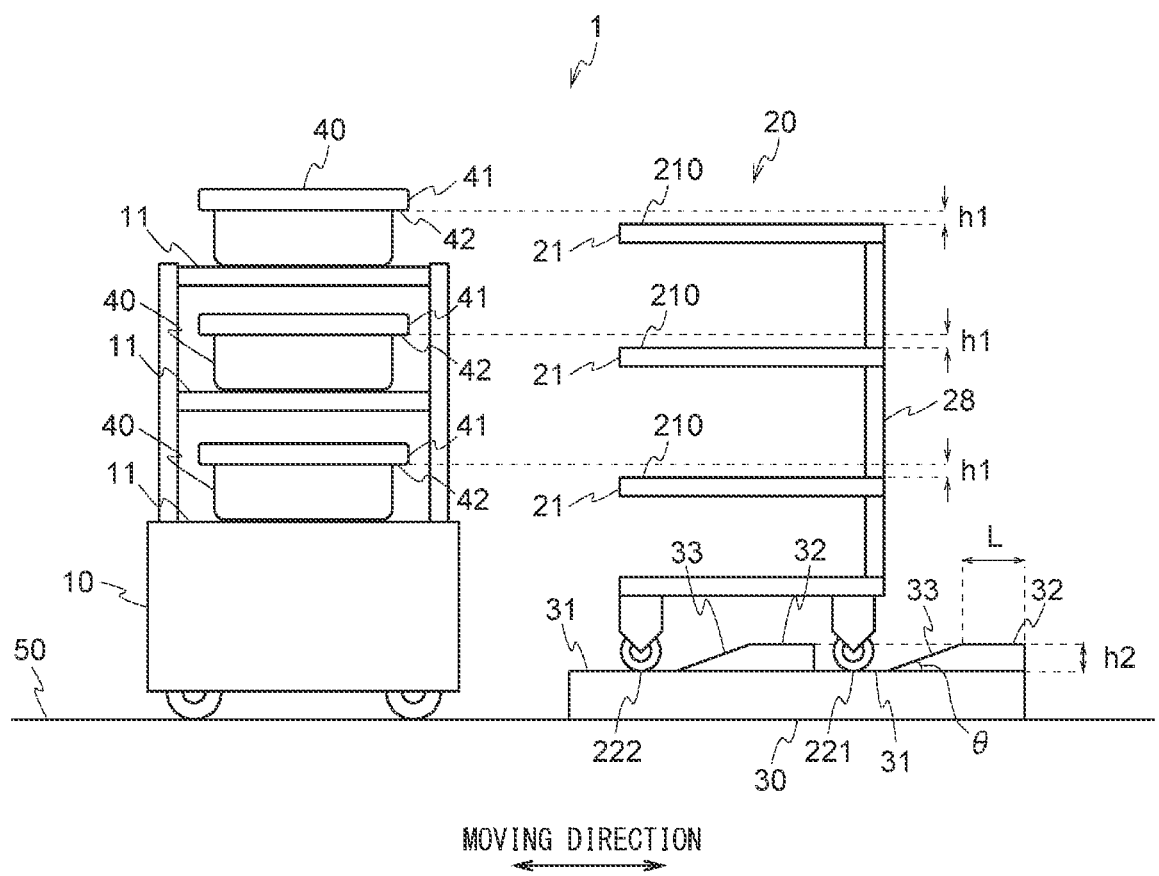
FIG. 1 is an elevation view of a conveyance system according to a first embodiment of the present disclosure.

A first embodiment according to the present disclosure will be described hereinafter with reference to the drawings. FIG. 1 is an elevation view of a conveyance system 1 according to the first embodiment. The conveyance system 1 is a system for conveying a plurality of containers 40, and includes an AGV 10, a cart 20, and platforms 30. In the conveyance system 1, a conveyance method is performed, the method including a process in which, by a force applied from the AGV 10, the cart 20 climbs up ramps of the platforms 30, and lifts and supports the containers 40 placed on the AGV 10.

Figure 2:
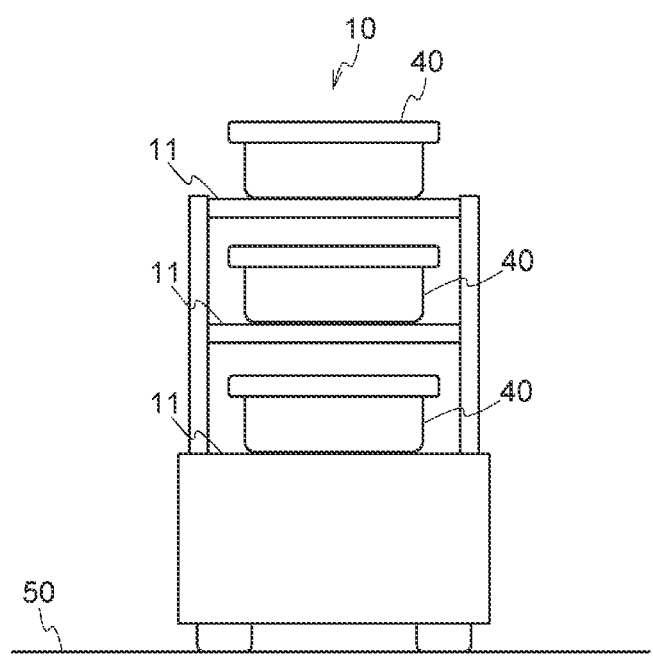
FIG. 2 is an elevation view of an AGV according to the first embodiment of the present disclosure as viewed in the moving direction of the AGV.

The AGV 10 is a vehicle capable of autonomously traveling, and simultaneously conveys a plurality of the containers 40. An object(s) to be conveyed is contained in each of the containers 40. The AGV 10 travels on an installation surface 50 such as a floor. In this embodiment, the AGV 10 may include at least one placement surface 11 on which a container 40 is disposed. FIG. 2 shows an elevation view of the AGV 10 as viewed in the moving direction of the AGV 10. The AGV 10 can move so as to move closer to the cart 20 and to move away from the cart 20. The AGV 10 delivers/receives at least one container 40 to/from the cart 20. Note that although three containers 40 are shown in FIG. 1, the number of containers 40 that the AGV 10 delivers/receives to/from the cart 20 is not limited to three.

Figure 3:
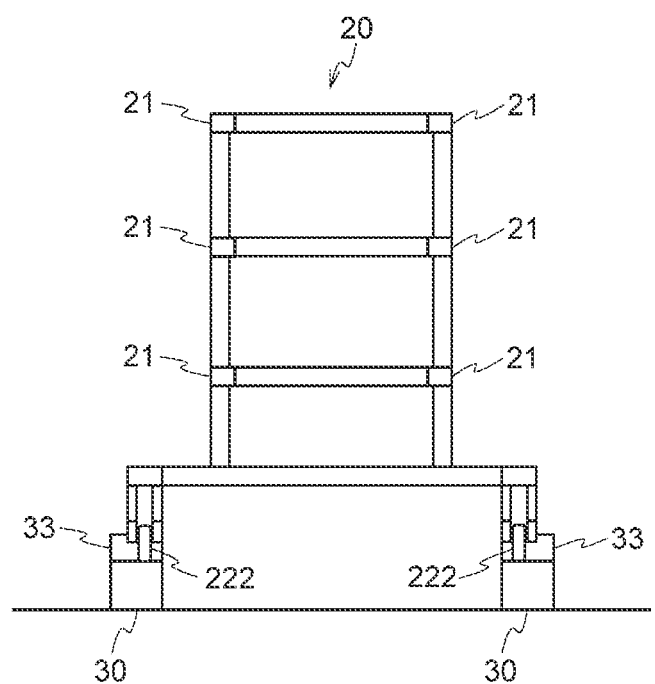
FIG. 3 is an elevation view showing a cart and platforms according to the first embodiment of the present disclosure as viewed in the moving direction of the cart.
Figure 4:
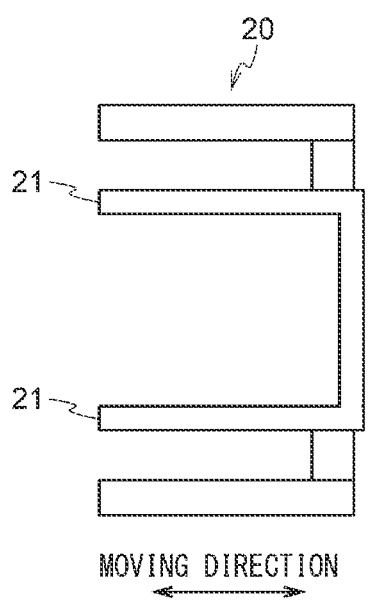
FIG. 4 is a plan view of the cart according to the first embodiment of the present disclosure.

The cart 20 is an apparatus for delivering/receiving a container(s) 40 to/from the AGV 10. The cart 20 is disposed on the platforms 30 and can travel on the upper surface of the platforms 30. FIG. 3 is an elevation view of the cart 20 and the platforms 30 as viewed in the moving direction of the cart 20. FIG. 4 is a plan view showing the cart 20. As shown in FIGS. 1, 3 and 4, the cart 20 includes a plurality of support parts 21 that support lateral ends 41 of the containers 40. As shown in FIG. 4, the support parts 21 extend in the moving direction of the cart 20. The support parts 21 are arranged so that a space is formed between adjacent support parts 21.

The cart 20 includes four wheels 221 and 222. In particular, the cart 20 includes a first pair of wheels composed of two wheels 221 that are arranged apart from each other, and a second pair of wheels compose of two wheels 222 that are arranged apart from each other. In this embodiment, the distance between the wheels 221 of the first pair and that between the wheels 222 of the second pair are equal to each other. As shown in FIG. 1, the cart 20 includes a vertical support part 28 that supports the support parts 21 on the side of the cart on which the first pair of wheels is disposed (hereinafter also referred to as the first wheel pair side).

Each of the platforms 30 is installed on the installation surface 50 such as a floor. Each of the platforms 30 includes a lower-side surface 31, an upper-side surface 32, and ramps 33. These constitute the upper surface of the platforms 30. The lower-side surface 31 and the upper-side surface 32 are substantially parallel to the installation surface 50. The lower-side surface 31 is continuous with the lower ends of the ramps 33. The upper-side surface 32 is continuous with the upper ends of the ramps 33. A length L of the upper-side surface 32 in the moving direction of the AGV 10 and the cart 20 can be set to a predetermined length or longer. The predetermined length can be the sum of the braking distance of the AGV 10 and an error in the stopping position of the AGV 10.

The inclination angle θ of the ramps 33 can be set to an angle that is determined according to the velocity of the AGV 10 at the moment when it comes into contact with the cart 20, the weight of the AGV 10, the weights of the container 40 and the object(s) to be conveyed, the weight of the cart 20, and the friction coefficient of the ramps 33. In some embodiments, the inclination angle θ of the ramps 33 is 30 degrees or smaller.

The conveyance system 1 is configured so that the height h2 of the ramps 33, which corresponds to the distance between the lower-side surface 31 and the upper-side surface 32, is larger than a distance h1 between the lower surfaces 42 of the lateral ends 41 of the container 40 placed on the AGV 10 and the upper surfaces 210 of the support parts 21 of the cart 20 in the state in which the cart 20 is disposed on the lower-side surface 31 of each of the platforms 30.

Figure 5:
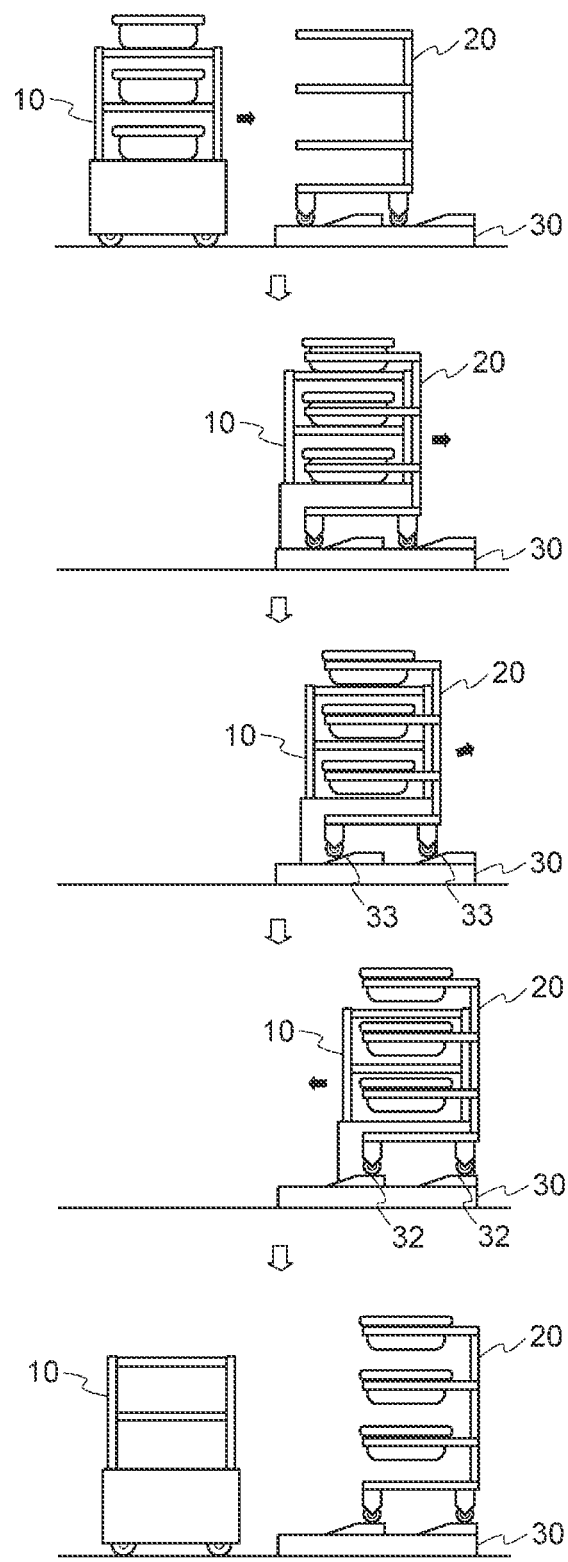
FIG. 5 is a diagram showing states in which, by a force applied from an AGV, the cart according to the first embodiment of the present disclosure climbs up ramps, and lifts and supports containers placed on the AGV.

FIG. 5 is a diagram showing states in which, by a force applied from the AGV 10, the cart 20 climbs up the ramps 33, and lifts and supports containers 40 placed on the AGV 10. Firstly, the AGV 10 on which the containers 40 are placed moves closer to the cart 20. Next, the AGV 10 comes into contact with the cart 20 and continues to move forward while pushing the cart 20. Since the cart 20 is pushed by the AGV 10, it climbs up the ramps 33 of each of the platforms 30, and lifts and supports the containers 40. When the cart 20 reaches the upper-side surface 32, the AGV 10 stops the traveling, so that the cart 20 stops on the upper-side surface 32. Lastly, the AGV 10 moves away from the cart 20. As a result, the delivering/receiving of the containers 40 from the AGV 10 to the cart 20 is completed.

In the above-described first embodiment, the conveyance system 1 includes the AGV 10 that conveys a plurality of containers 40, the cart 20 that supports the containers 40, and two platforms 30 each of which includes ramps on which the cart 20 travels. By a force applied from the AGV 10, the cart 20 climbs up the ramps, and lifts and supports the containers 40 placed on the AGV 10. In this way, the conveyance system 1 can simultaneously deliver/receive a plurality of containers 40, and thereby to efficiently deliver/receive containers between the AGV 10 and the cart 20. Further, the conveyance system 1 can deliver/receive containers 40 between the AGV 10 and the cart 20 by using the power (i.e., the force) of the AGV 10. Therefore, the cart 20 does not need to be equipped with any power mechanism.

Further, in the first embodiment, the conveyance system is configured so that the height h2 of the ramps of each of the platforms 30 is larger than the distance h1 between the lower surfaces 42 of the lateral ends 41 of the container 40 placed on the AGV 10 and the corresponding support parts 21 of the cart 20 in the state in which the cart 20 is disposed on the lower-side surface 31 of each of the platforms 30. In this way, when the cart 20 climbs up the ramps by the force applied from the AGV 10, it can reliably lift the containers 40 placed on the AGV 10.

Further, in the first embodiment, the length L of the upper-side surface 32 of each of the platforms 30 in the moving direction of the AGV 10 and the cart 20 can be set to a predetermined length or longer. The predetermined length can be the sum of the braking distance of the AGV 10 and the error in the stopping position of the AGV 10. In the case where the AGV 10 stops in response to the detection of a target object disposed around each of the platforms 30 by a sensor provided in the AGV 10, an error may occur in the stopping position of the AGV 10. By setting the length L of the upper-side surface 32 to a value equal to or larger the sum of the braking distance of the AGV 10 and the error in the stopping position of the AGV 10, the AGV 10 can reliably stop on the upper-side surface 32 even when the error occurs in the stopping position of the AGV 10.

Second Embodiment

Figure 6:
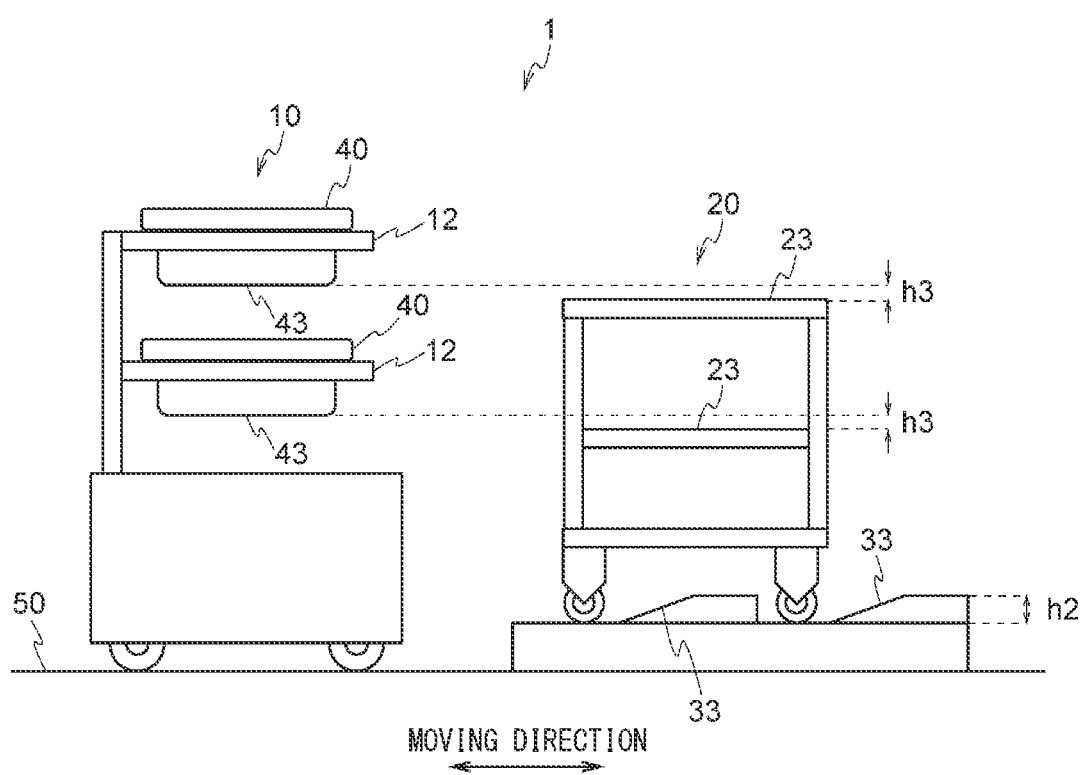
FIG. 6 is an elevation view of a conveyance system according to a second embodiment of the present disclosure.

FIG. 6 is an elevation view of a conveyance system 1 according to second embodiment of the present disclosure. In the second embodiment, an AGV 10 includes support parts 12 that support containers 40, and a cart 20 includes placement surfaces 23 on which the containers 40 are disposed. The second embodiment will be described hereinafter with a particular emphasis on differences from the first embodiment.

Figure 7:
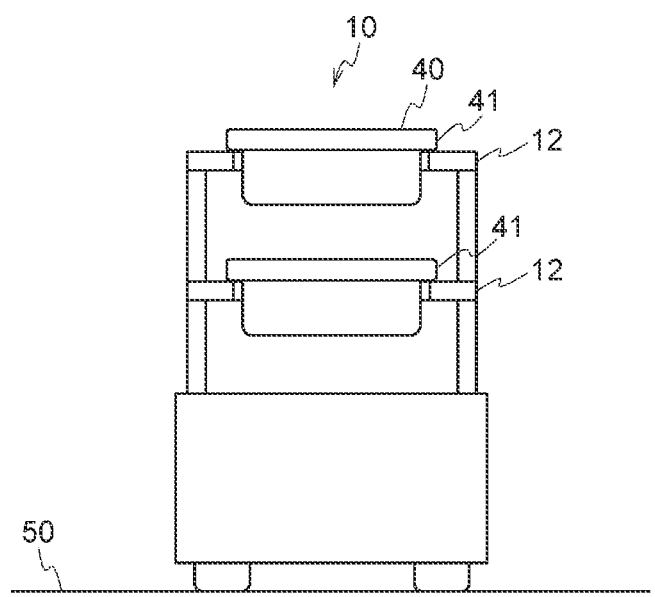
FIG. 7 is an elevation view of an AGV according to the second embodiment of the present disclosure as viewed in the moving direction of the AGV.
Figure 8:
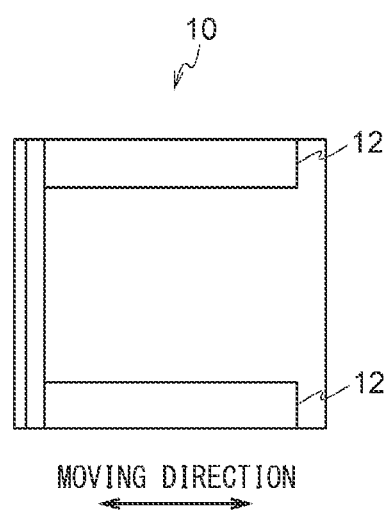
FIG. 8 is a plan view of the AGV according to the second embodiment of the present disclosure.

FIG. 7 shows an elevation view of the AGV 10 as viewed in the moving direction of the AGV 10. FIG. 8 shows a plan view of the AGV 10. As shown in FIGS. 6 to 8, the AGV 10 includes a plurality of support parts 12 that support the lateral ends 41 of containers 40. The support parts 12 extend in the moving direction of the cart 20. The support parts 12 are arranged so that a space is formed between adjacent support parts 12.

Figure 9:
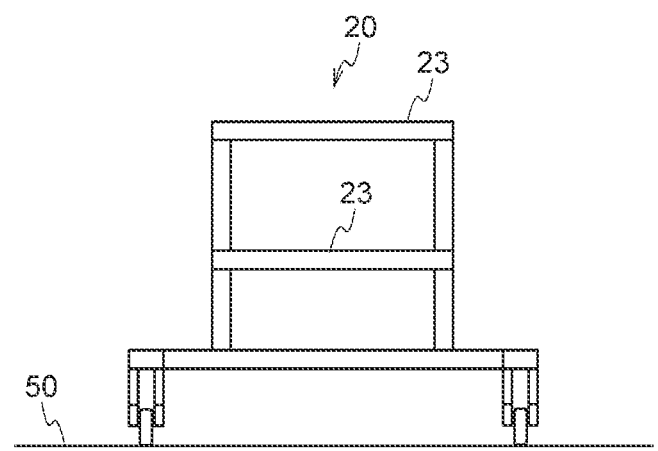
FIG. 9 is an elevation view of a cart according to the second embodiment of the present disclosure as viewed in the moving direction of the cart.
Figure 10:
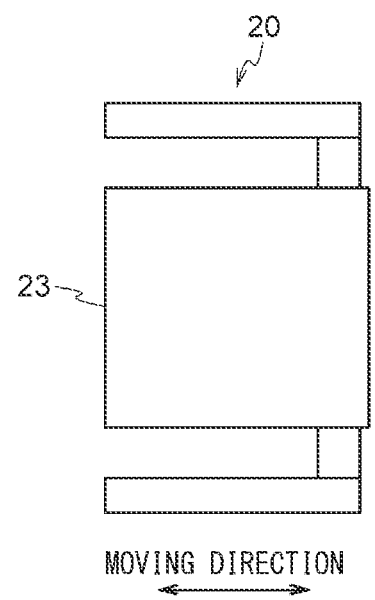
FIG. 10 is a plan view of a cart according to the second embodiment of the present disclosure.

FIG. 9 is an elevation view of the cart 20 as viewed in the moving direction of the cart 20. FIG. 10 is a plan view of the cart 20. As shown in FIGS. 9 and 10, the cart 20 includes a plurality of placement surfaces 23.

As shown in FIG. 6, in the conveyance system 1 according to the second embodiment, the conveyance system is configured so that the height h2 of the ramps 33 is larger than the distance h3 between the lower surface 43 of the container 40 of which the lateral ends 41 are supported by the AGV 10 and the corresponding placement surface 23 of the cart 20 in the state in which the cart 20 is disposed on the lower-side surface 31 of each of the platforms 30.

In the second embodiment, similarly to the first embodiment, by a force applied from the AGV 10, the cart 20 climbs up the ramps 33 and lifts the containers 40 supported by the AGV 10, so that the containers 40 are disposed on the placement surfaces 23. As a result, the delivering/receiving of the containers 40 from the AGV 10 to the cart 20 is completed.

Further, in the second embodiment, the conveyance system is configured so that the height h2 of the ramps of each of the platforms 30 is larger than the distance h3 between the lower surface 43 of the container 40 supported by the AGV 10 and the corresponding placement surface 23 of the cart 20 in the state in which the cart 20 is disposed on the lower-side surface 31 of each of the platforms 30. In this way, when the cart 20 climbs up the ramps by the force applied from the AGV 10, it can reliably lift the containers 40 placed on the AGV 10.

Third Embodiment

Figure 11:
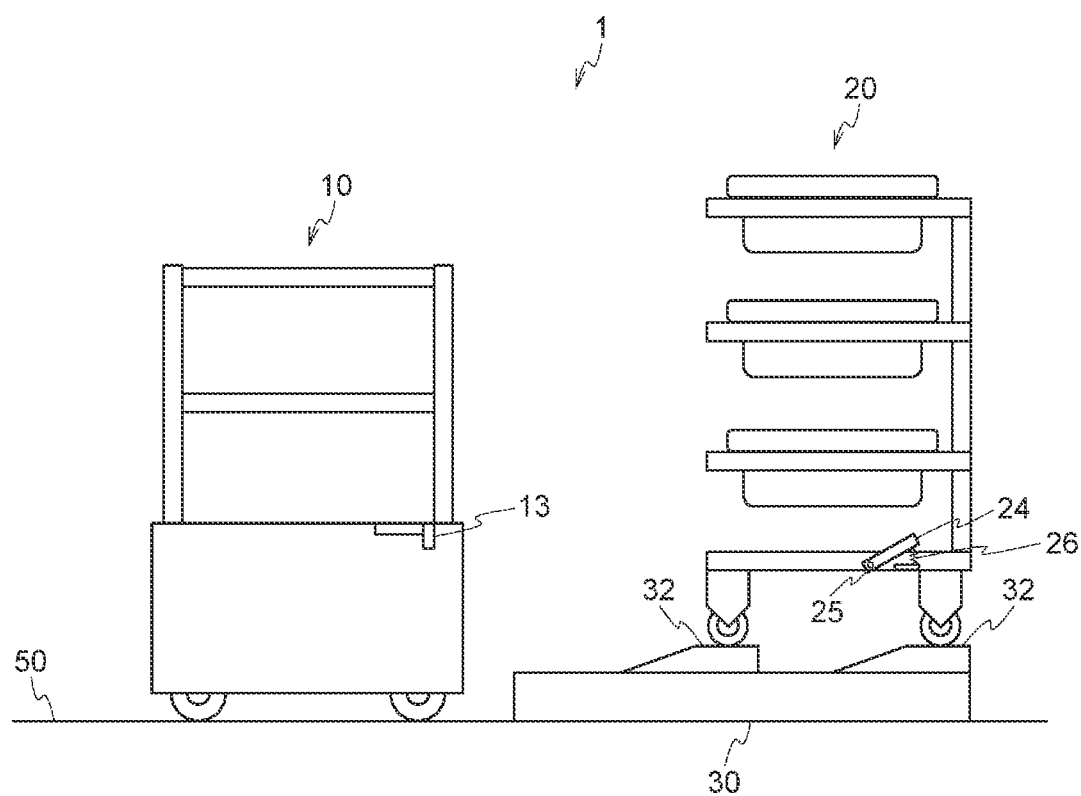
FIG. 11 is an elevation view of a conveyance system according to a third embodiment of the present disclosure.

FIG. 11 is an elevation view of a conveyance system 1 according to a third embodiment of the present disclosure. In the third embodiment, an AGV 10 includes first engagement parts 13, and a cart 20 includes second engagement parts 24 corresponding to the first engagement parts 13. The first and second engagement parts 13 and the 24 are configured so as to engage with each other in a state in which the cart 20 is disposed on the upper-side surface 32 of each of the platforms 30.

Figure 12:
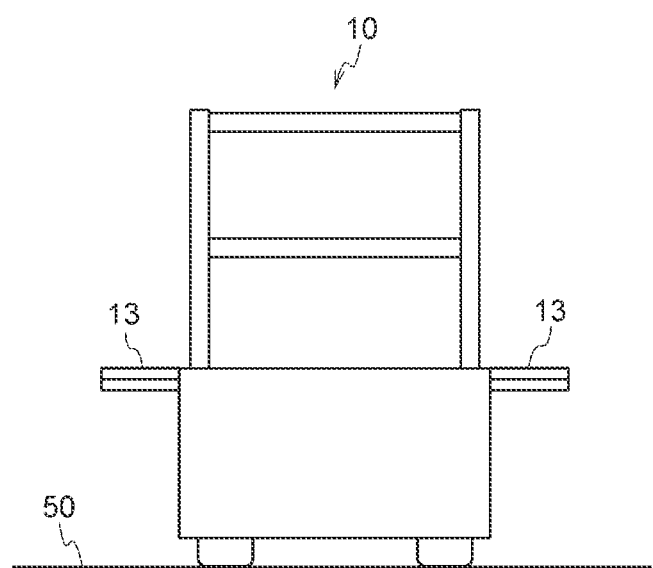
FIG. 12 is an elevation view of an AGV according to the third embodiment of the present disclosure as viewed from the moving direction of the AGV.

FIG. 12 is an elevation view of the AGV 10 according to the third embodiment as viewed in the moving direction of the AGV 10. In this embodiment, as shown in FIGS. 11 and 12, an L-shaped first engagement part 13 is provided on each of both sides of the AGV 10. Note that the shape of the first engagement part 13 is not limited to the L-shape, but can be any shape by which the first engagement part 13 can engage with the second engagement part 24. Further, the first engagement part 13 may be provided on only one side of the AGV 10.

Figure 13:
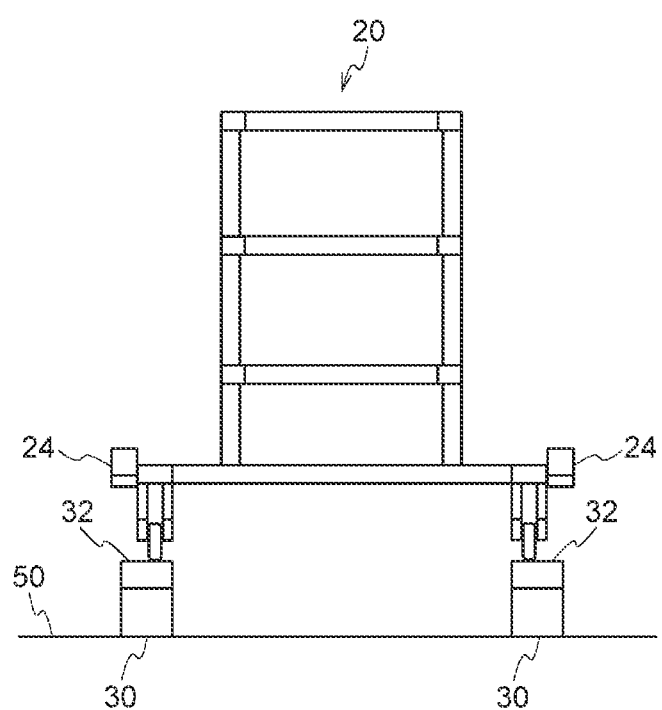
FIG. 13 is an elevation view of a cart according to the third embodiment of the present disclosure as viewed in the moving direction of the cart.

FIG. 13 is an elevation view of the cart 20 according to the third embodiment as viewed in the moving direction of the cart 20. In this embodiment, as shown in FIGS. 11 and 13, a plate-like second engagement part 24 is provided on each of both sides of the cart 20. Note that the shape of the second engagement part 24 is not limited to the plate-like shape, but can be any shape by which the second engagement part 24 can engage with the first engagement part 13. Further, the second engagement part 24 may be provided on only one side of the cart 20.

Figure 14:
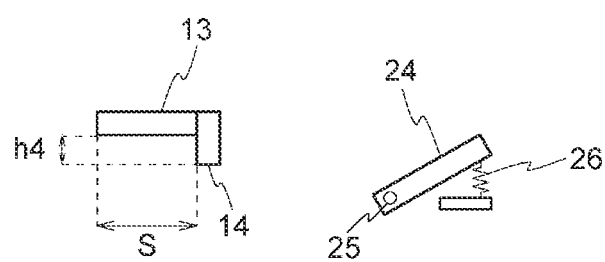
FIG. 14 shows details of a first engaging part and a second engaging part according to the third embodiment of the present disclosure.

FIG. 14 shows details of the first engagement part 13 and the second engagement part 24. One end of the second engagement part 24 is rotatably fixed to the cart 20 by a fixing member 25 such as a pin. An elastic member 26 such as a spring is connected to the other end of the second engagement part 24, and a force pressing the second engagement part 24 upward is applied thereto by the elastic member 26. The height h4 of a projection 14 of the first engagement part 13 in the vertical direction is smaller than the height h2 of the ramps 33.

The length S of the first engagement part 13 in the moving direction of the AGV 10 can be set to a predetermined length or longer. The predetermined length can be the sum of the braking distance of the AGV 10 and the error in the stopping position of the AGV 10. In this way, the AGV 10 can reliably stop on the upper-side surface 32 even when the error occurs in the stopping position of the AGV 10.

Figure 15:
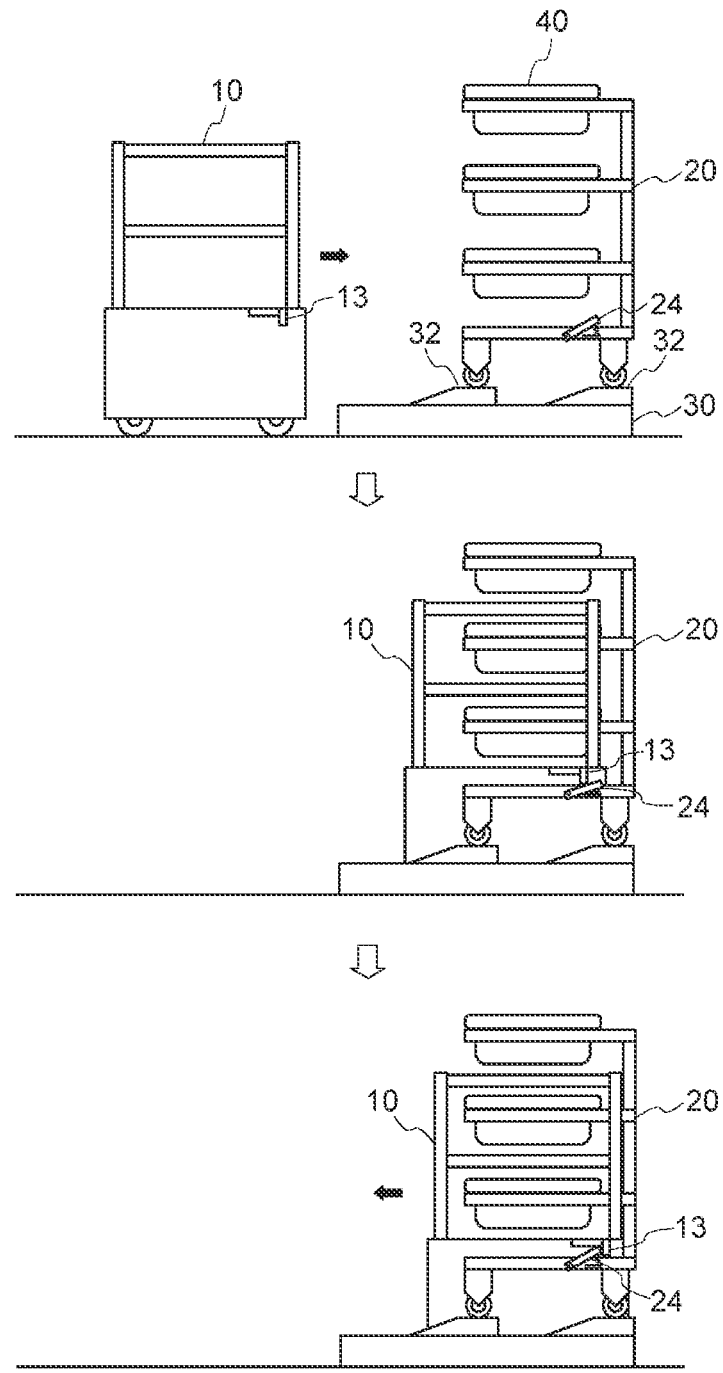
FIG. 15 is a diagram showing states in which the AGV according to the third embodiment of the present disclosure collects containers from the cart disposed on the upper-side surface of platforms.
Figure 16:
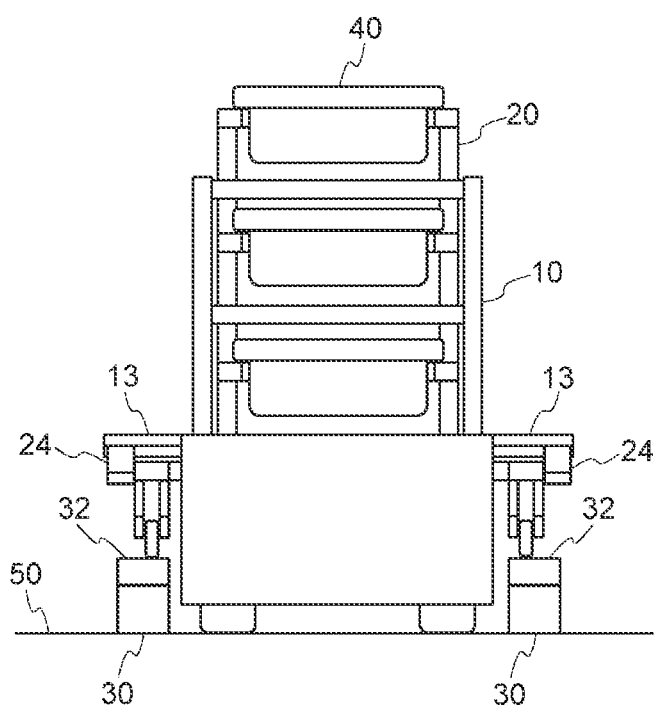
FIG. 16 shows the AGV and the cart according to the third embodiment of the present disclosure in a state in which the first and second engaging parts are engaged with each other.
Figure 17:
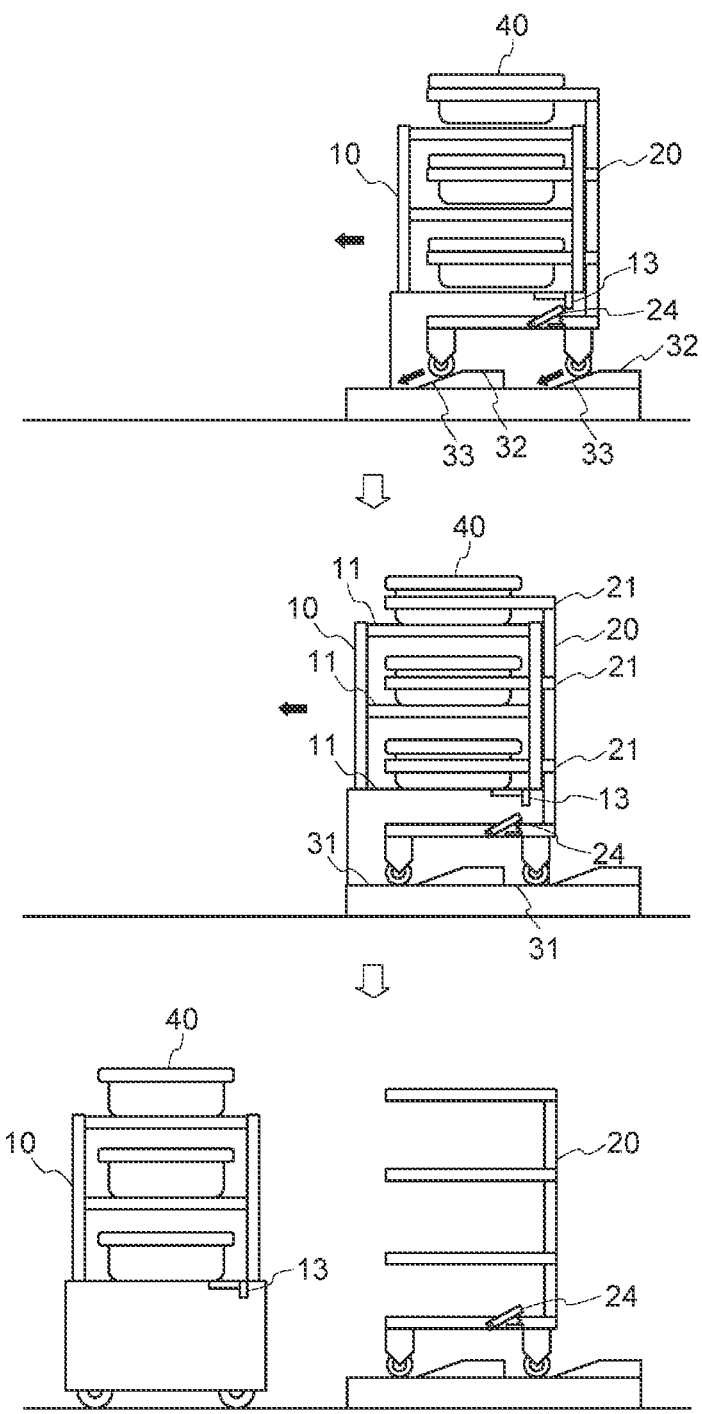
FIG. 17 is a diagram showing states in which the AGV according to the third embodiment of the present disclosure collects containers from the cart disposed on the upper-side surface of platforms.

FIGS. 15 and 17 are diagrams showing states in which the AGV 10 collects containers 40 from the cart 20 disposed on the upper-side surface 32 of each of the platforms 30. As shown in FIG. 15, firstly, the AGV 10 moves closer to the cart 20. In a state in which the first engagement parts 13 of the AGV 10 are in contact with the second engagement parts 24 of the cart 20, the AGV 10 continues to move forward. As a result, the vertical protrusions 14 of the first engagement parts 13 press down the second engagement parts 24. When the AGV 10 further continues to move forward, the second engagement parts 24 are released from the pressing by the first engagement parts 13, so that the second engagement parts 24 rotate and return to their original states, and as a result, the first engagement parts 13 and the second engagement parts 24 engage with each other. FIG. 16 shows the AGV 10 and the cart 20 in the state in which the first engagement parts 13 and the second engagement parts 24 are engaged with each other.

Next, as shown in FIG. 17, when the AGV 10 moves backward, the cart 20 moves from the upper-side surface 32 toward the ramps 33 by a force that is applied from the AGV 10 to the cart 20 through the engagement of the first engagement parts 13 and the second engagement parts 24. Then, as the cart 20 goes down the ramps 33, the positions of the support parts 21 of the cart 20 are lowered, so that the containers 40 are supported by the placement surfaces 11 of the AGV 10. When the cart 20 moves to the lower-side surface 31, the engagement between the first and second engagement parts 13 and 24 is completely disengaged, and the cart 20 stops on the lower-side surface 31. Meanwhile, the AGV 10 continues to move backward, so that it can collect the containers 40 from the cart 20.

In the third embodiment, the AGV 10 includes the first engagement parts 13, and the cart 20 includes the second engagement parts 24 corresponding to the first engagement parts 13 of the AGV 10. The first and second engagement parts 13 and 24 are configured so as to engage with each other in the state in which the cart 20 is disposed on the upper-side surface 32 of each of the platforms 30. Therefore, the AGV 10 can move the cart 20 from the upper-side surface 32 to the ramps 33 and collect the containers 40 from the cart 20 by applying a force to the cart 20 supporting the containers 40 through the engagement between the first and second engagement parts 13 and 24.

Fourth Embodiment

Figure 18:
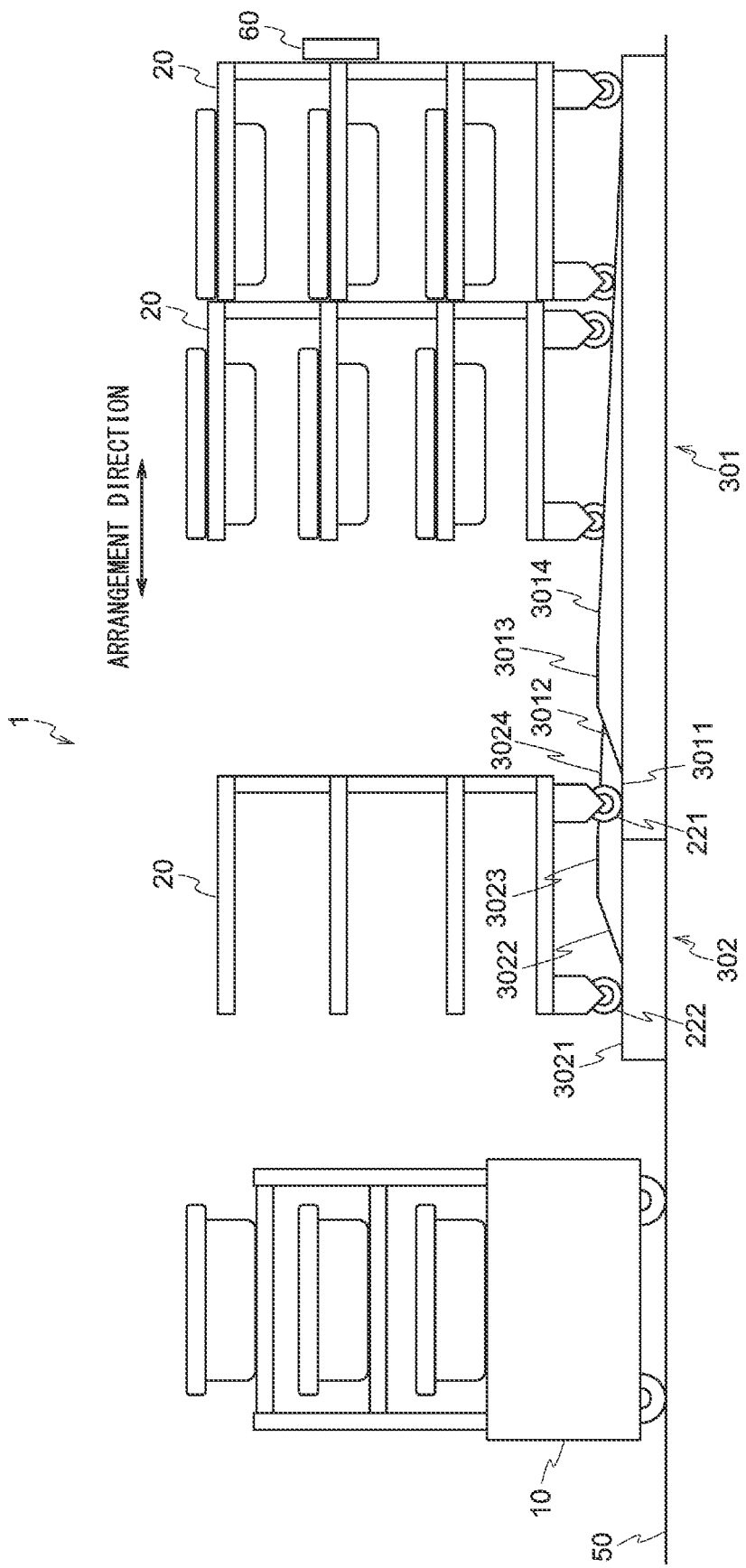
FIG. 18 is an elevation view of a conveyance system according to a fourth embodiment of the present disclosure.

FIG. 18 is an elevation view of a conveyance system 1 according to a fourth embodiment of the present disclosure. In the fourth embodiment, as shown in FIG. 18, a plurality of carts 20 are arranged on platforms 301 and 302. The fourth embodiment will be described hereinafter with a particular emphasis on differences from the above-described embodiments.

Figure 19:
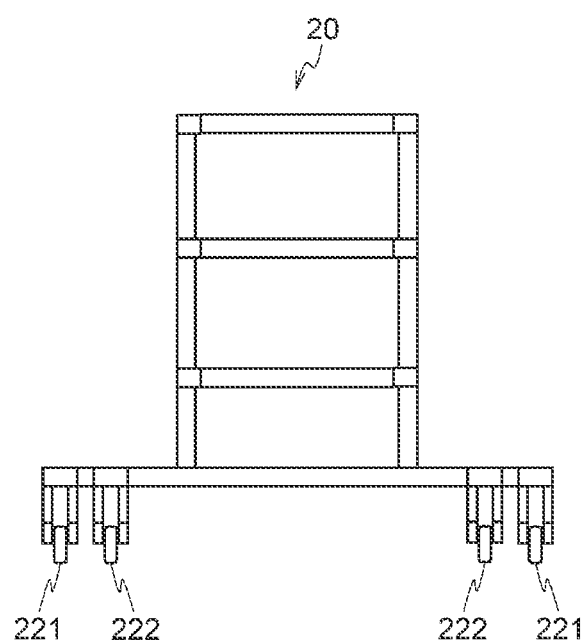
FIG. 19 is an elevation view of carts according to the fourth embodiment of the present disclosure as viewed in a direction in which the carts are arranged.
Figure 20:
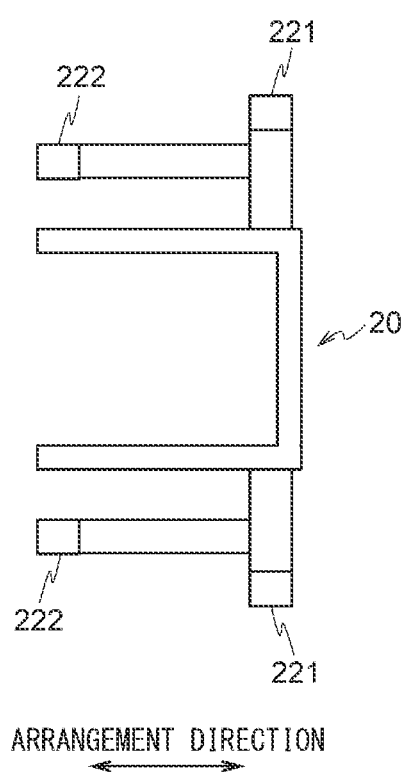
FIG. 20 is a plan view of the cart according to the fourth embodiment of the present disclosure.

FIG. 19 is an elevation view of a cart 20 as viewed in the direction in which the plurality of carts 20 are arranged. FIG. 20 is a plan view of the cart 20. As shown in FIGS. 19 and 20, the distance between the wheels 221 of the first pair of the cart 20 and that between the wheels 222 of the second pair thereof differ from each other.

Figure 21:
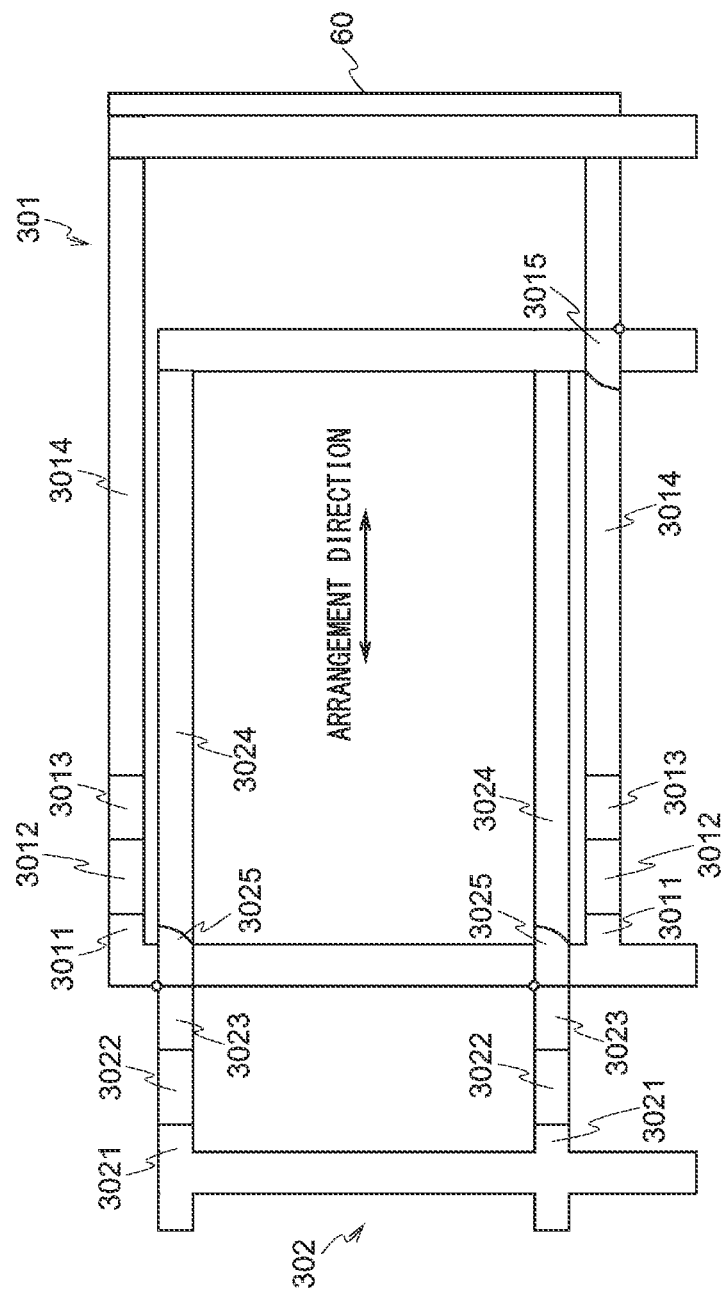
FIG. 21 is a plan view showing an example of the conveyance system according to the fourth embodiment of the present disclosure.

FIG. 21 is a plan view showing an example of the conveyance system 1 according to the fourth embodiment. The conveyance system 1 includes a platform 301 on which a first pair of wheels of the cart 20 runs (i.e., rolls) and a platform 302 on which a second pair of wheels runs (i.e., rolls). The platforms 301 and 302 include lower-side surfaces 3011 and 3021, respectively, first ramps 3012 and 3022, respectively, upper-side surfaces 3013 and 3023, respectively, and second ramps 3014 and 3024, respectively. They constitute the upper surfaces of the platforms 301 and 302.

The first ramps 3012 and 3022 are continuous with the lower-side surfaces 3011 and 3021, respectively, and extend upward therefrom. The upper-side surfaces 3013 and 3023 are continuous with the upper ends of the first ramps 3012 and 3022, respectively. The second ramps 3014 and 3024 are continuous with the upper-side surfaces 3013 and 3023, respectively, and extend downward therefrom. A plurality of carts 20 are arranged on the second ramps 3014 and 3024.

Figure 22:
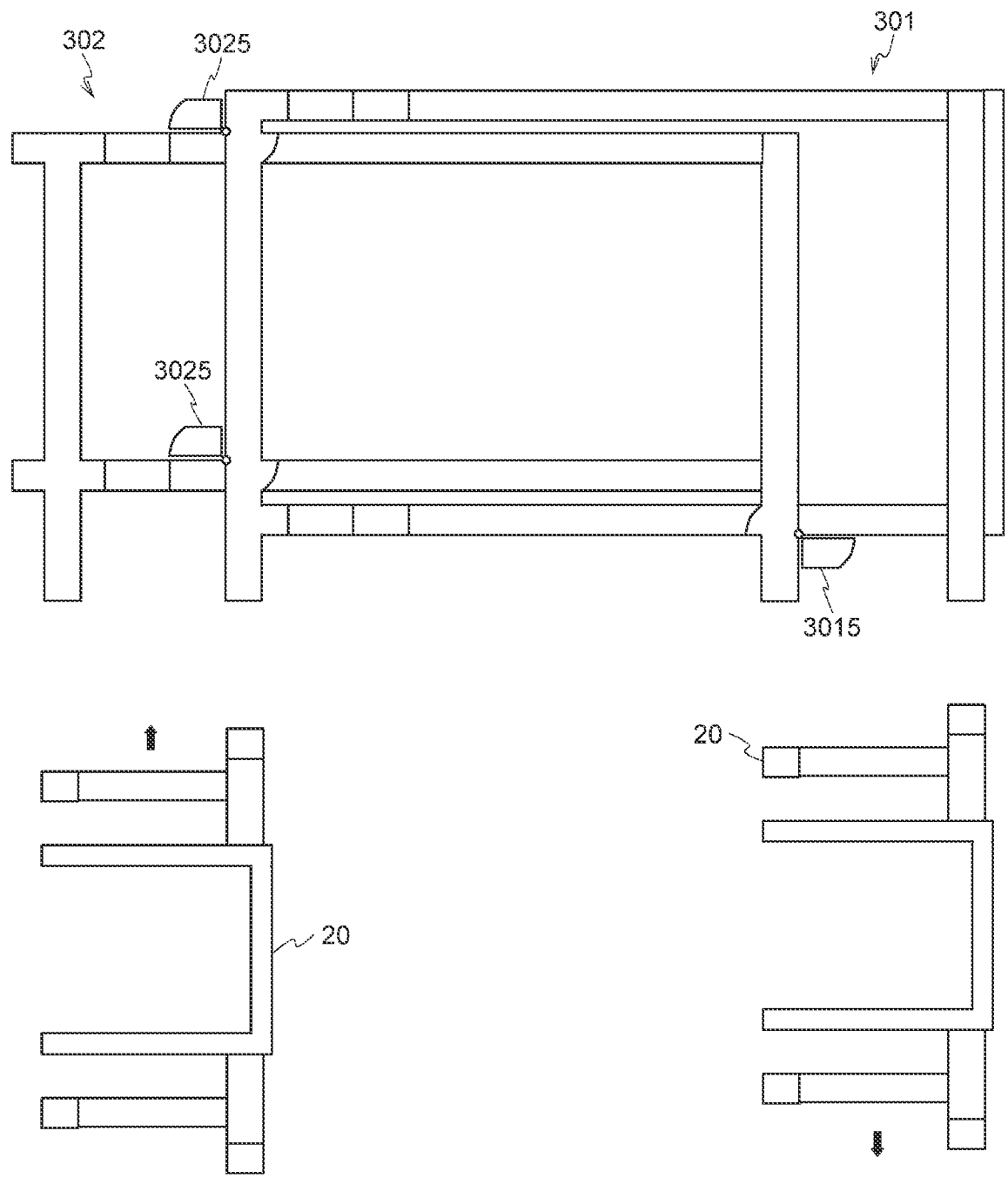
FIG. 22 is a diagram showing platforms in a state in which a cart according to the fourth embodiment of the present disclosure can move in a direction perpendicular to a direction in which the carts are arranged.

The platforms 301 and 302 are configured so that the carts 20 can move in a direction perpendicular to the direction in which the carts 20 are arranged. FIG. 22 shows the platforms 301 and 302 in a state in which the carts 20 can move in the direction perpendicular to the direction in which the carts 20 are arranged. The platforms 301 and 302 include movable parts 3015 and 3025, respectively, each of which can rotate. As the movable parts 3015 and 3025 pivot and open, passages through which the carts 20 can pass therethrough is formed. As shown in FIG. 22, the carts 20 are disposed on the platforms 301 and 302 through these passages. Further, the carts 20 are also collected from the platforms 301 and 302 through these passages.

Further, as shown in FIGS. 18 and 21, the conveyance system 1 also includes a stopper 60 that restricts the movements of the carts 20 arranged on the second ramps 3014 and 3024. The stopper 60 can be fixed to a wall, the installation surface 50, or the like.

In the fourth embodiment, a plurality of carts 20 can be arranged on the platforms 30 as described above. The platforms 30 are configured so that cart 20 can move in the direction perpendicular to the direction in which the carts 20 are arranged. Therefore, even when a plurality of carts 20 are arranged on the platforms 30, the carts 20 can be collected from the platforms 30 and can be replenished on the platforms 30 (e.g., the carts 20 can be returned to the platforms 30).

Further, in the fourth embodiment, the conveyance system further includes the stopper that restricts the movements of the carts 20 arranged on the platforms 30. Therefore, it is possible to restrict the movements of the carts 20 arranged on the second ramps 3014 and 3024.

Fifth Embodiment

Figure 23:
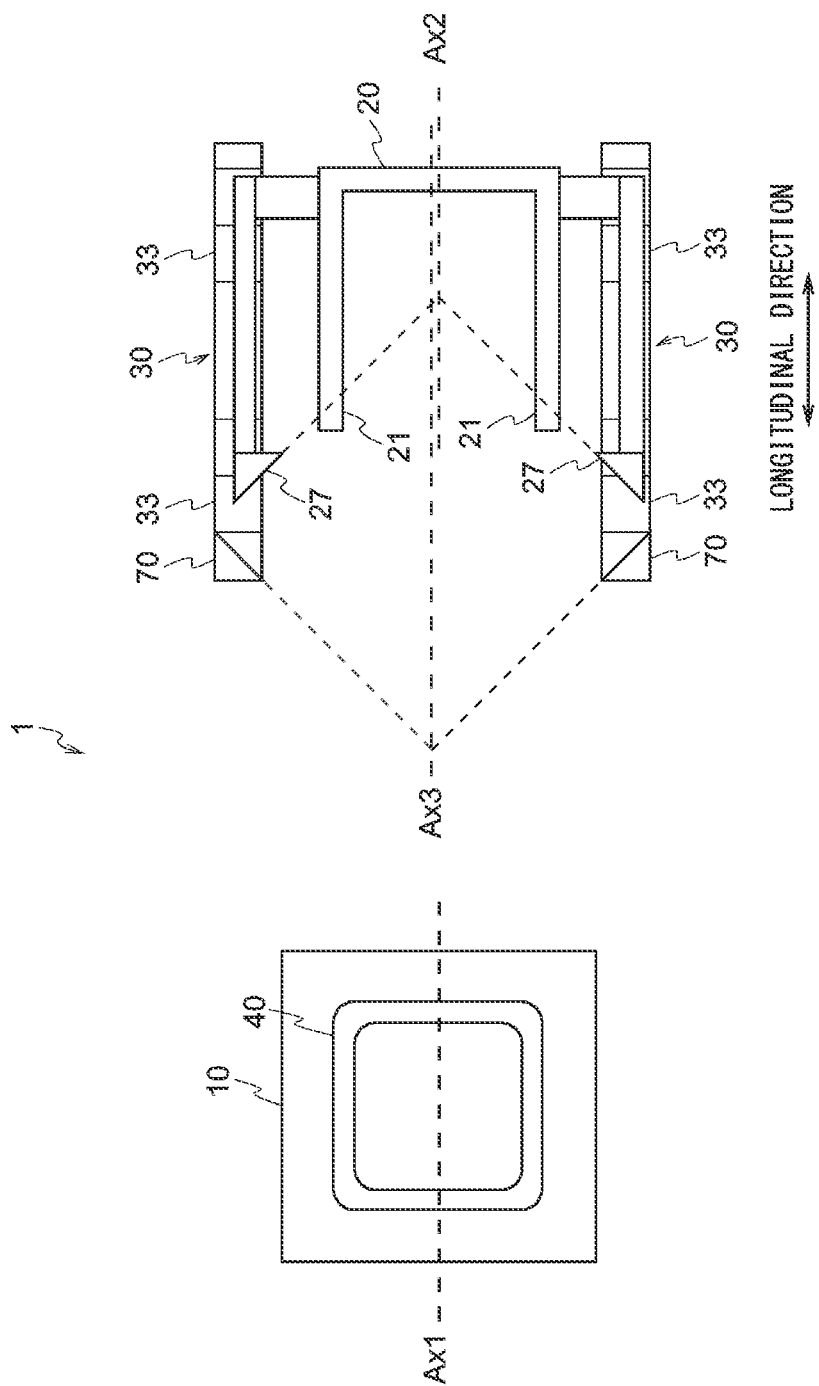
FIG. 23 is a plan view of a conveyance system according to a fifth embodiment of the present disclosure.

FIG. 23 is a plan view of a conveyance system 1 according to a fifth embodiment. In the fifth embodiment, aligning between an AGV 10 and a cart 20, and aligning between the cart 20 and platforms 30 are performed. The fifth embodiment will be described hereinafter with a particular emphasis on differences from the above-described embodiments.

The cart 20 includes two first guides 27 by which the central axis Ax2 of the cart 20 is aligned with the central axis Ax1 of the AGV 10 in the longitudinal direction of the platforms 30 by using a force applied from the AGV 10 to the cart 20. Each of the first guides 27 is provided at the end of a respective one of the sides of the cart 20. The first guides 27 are arranged so as to be spaced apart from each other so that the AGV 10 can enter the inside of the cart 20. Each of the first guides 27 has a shape that makes it possible to align the central axis Ax1 of the AGV 10 with the central axis Ax2 of the cart 20. For example, the side surfaces of the first guides 27 with which the AGV 10 comes into contact can be configured so that their extension lines intersect each other at the central axis Ax2.

Figure 24:
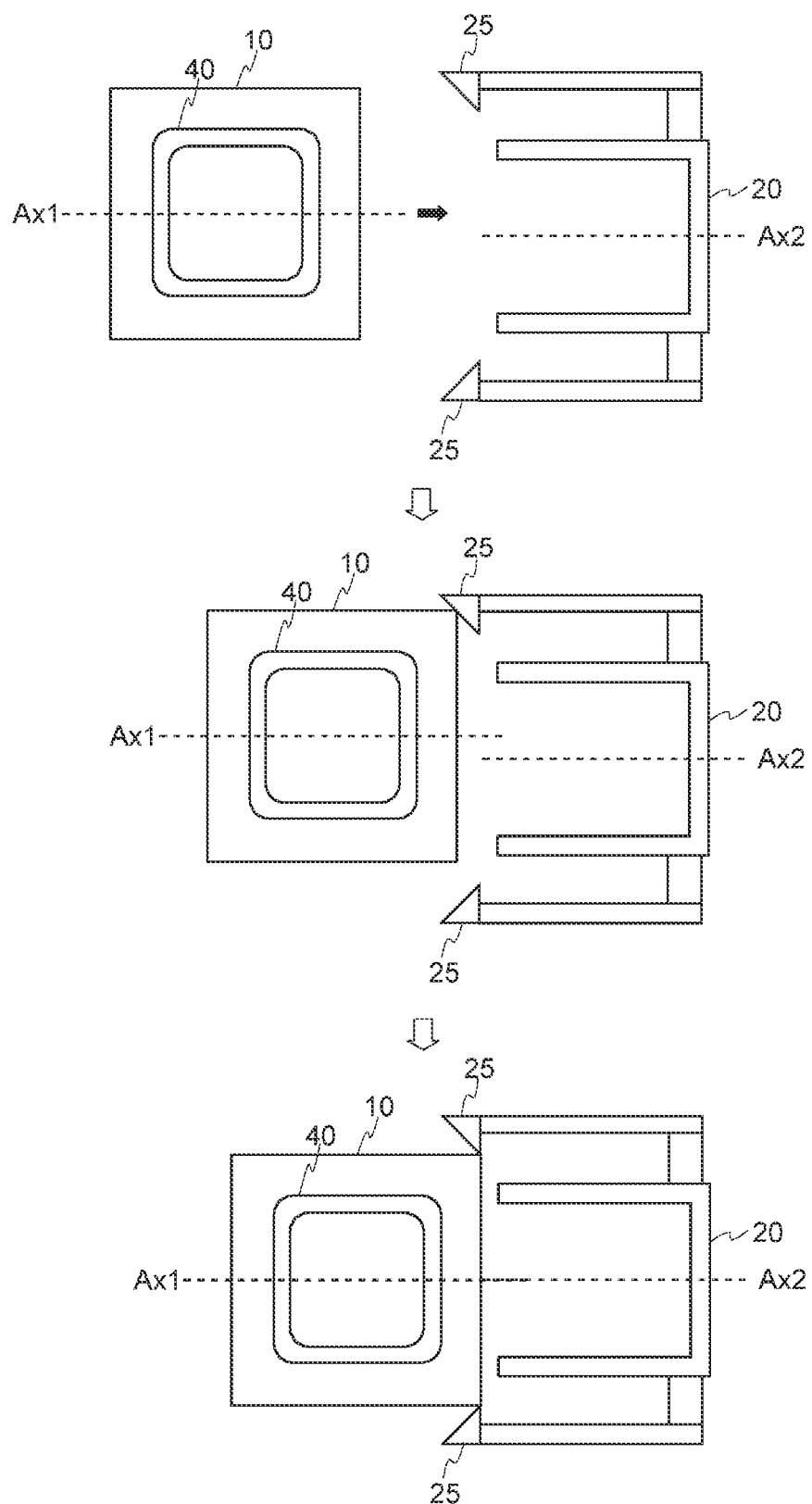
FIG. 24 is a diagram showing a state in which the AGV and the cart according to the fifth embodiment of the present disclosure are aligned with each other.

FIG. 24 is a diagram showing a state in which the AGV 10 and the cart 20 are aligned with each other. As shown in FIG. 24, the front end of the AGV 10 moves forward while being (i.e., remaining) in contact with the first guides 27 of the cart 20, so that the central axis Ax1 of the AGV 10 and the central axis Ax2 of the cart 20 are aligned with each other. That is, the positions of the AGV 10 and the cart 20 can be aligned with each other.

In general, in order to maximize the storage capacity of the container 40, the container 40 is designed so that the width of the lateral ends 41 of the container 40 becomes smaller. Therefore, by aligning the positions of the lateral ends 41 of the container 40 with the positions of the support parts 21 of the cart 20, the support parts 21 of the cart 20 can reliably support the lateral ends 41 of the container 40.

Further, as shown in FIG. 23, the conveyance system 1 also includes two second guides 70 by which the central axis Ax2 of the cart 20 is aligned with the central axis Ax3 of the platforms 30 in the longitudinal direction thereof located between two platforms 30. In the example shown in FIG. 23, each of the second guides 70 is provided at the end of a respective one of the sides of each of the platforms 30. The second guides 70 may be provided on the installation surface 50.

The second guides 70 are arranged so as to be spaced apart from each other so that the AGV 10 can travel between the two platforms 30. Each of the second guides 70 has a shape by which the central axis Ax2 of the cart 20 is aligned with the central axis Ax3 of the platforms 30. For example, the side surfaces of the second guides 70 with which the first guides 27 located at the front end of the cart 20 comes into contact can be configured so that their extension lines intersect each other at the central axis Ax3.

Figure 25:
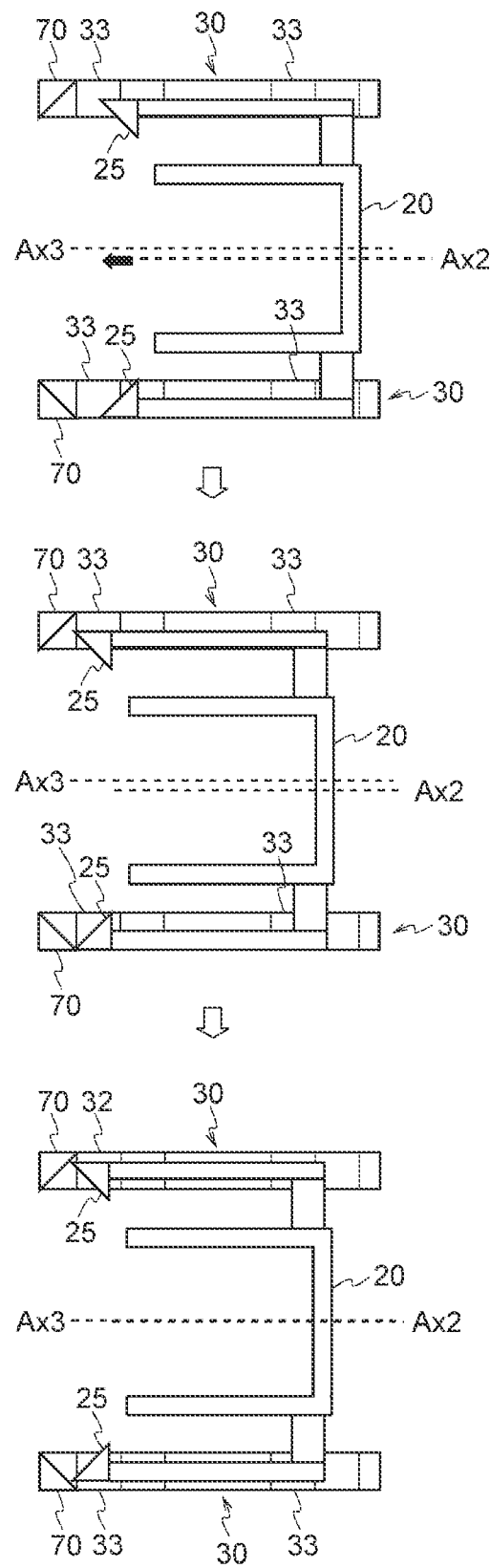
FIG. 25 is a diagram showing a state in which the cart and platforms according to the fifth embodiment of the present disclosure are aligned with each other.

FIG. 25 is a diagram showing a state in which the cart 20 and the platforms 30 are aligned with each other. As shown in FIG. 25, when the cart 20 goes down the ramps 33 of the platforms 30, the front end of the cart 20 moves forward while being (i.e., remaining) in contact with the second guides 70, so that the central axis Ax2 of the cart 20 and the central axis Ax3 of the platforms 30 are aligned with each other. That is, the positions of the cart 20 and the platforms 30 can be aligned with each other.

Sixth Embodiment

As described above with reference to FIG. 1, the cart 20 includes the first pair of wheels composed of the wheels 221, the second pair of wheels composed of the wheels 222, and the vertical support part 28 that supports the support parts 21 on the first wheel pair side. Since the vertical support part 28 is disposed on the first wheel pair side, the center of gravity of the cart 20 is located on the first wheel pair side. In the sixth embodiment, each of the platforms 30 is configured so as to stabilize the posture of the cart 20 when it goes down the ramps of each of the platforms 30.

Figure 26:
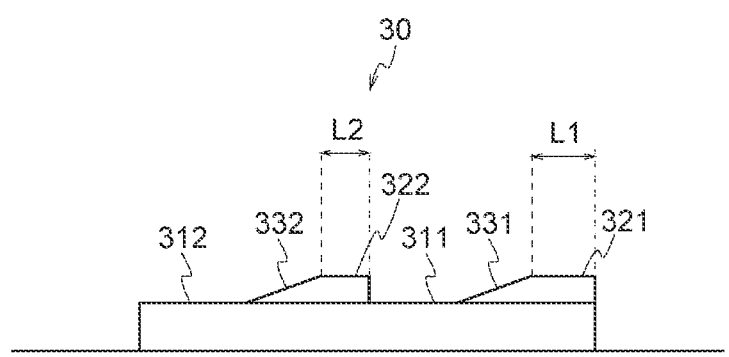
FIG. 26 is an elevation view showing a platform according to a sixth embodiment of the present disclosure.

FIG. 26 is an elevation view of a platform 30 according to the sixth embodiment. As shown in FIG. 26, the platform 30 includes lower-side surfaces 311 and 312, ramps 331 and 332, and upper-side surfaces 321 and 322. The upper-side surfaces 321 and 322 correspond to the first upper-side surfaces and the second upper-side surfaces, respectively. The first upper-side surfaces 321 are continuous with the upper ends of the ramps 331 on which the first pair of wheels of the cart 20 runs (i.e., rolls). The second upper-side surfaces 322 are continuous with the upper ends of the ramps 332 on which the second pair of wheels of the cart 20 runs (i.e., rolls). The length L1 of the first upper-side surface 321 in the longitudinal direction of the platforms 30 is longer than the length L2 of the second upper-side surface 322 in the longitudinal direction thereof.

Figure 27:
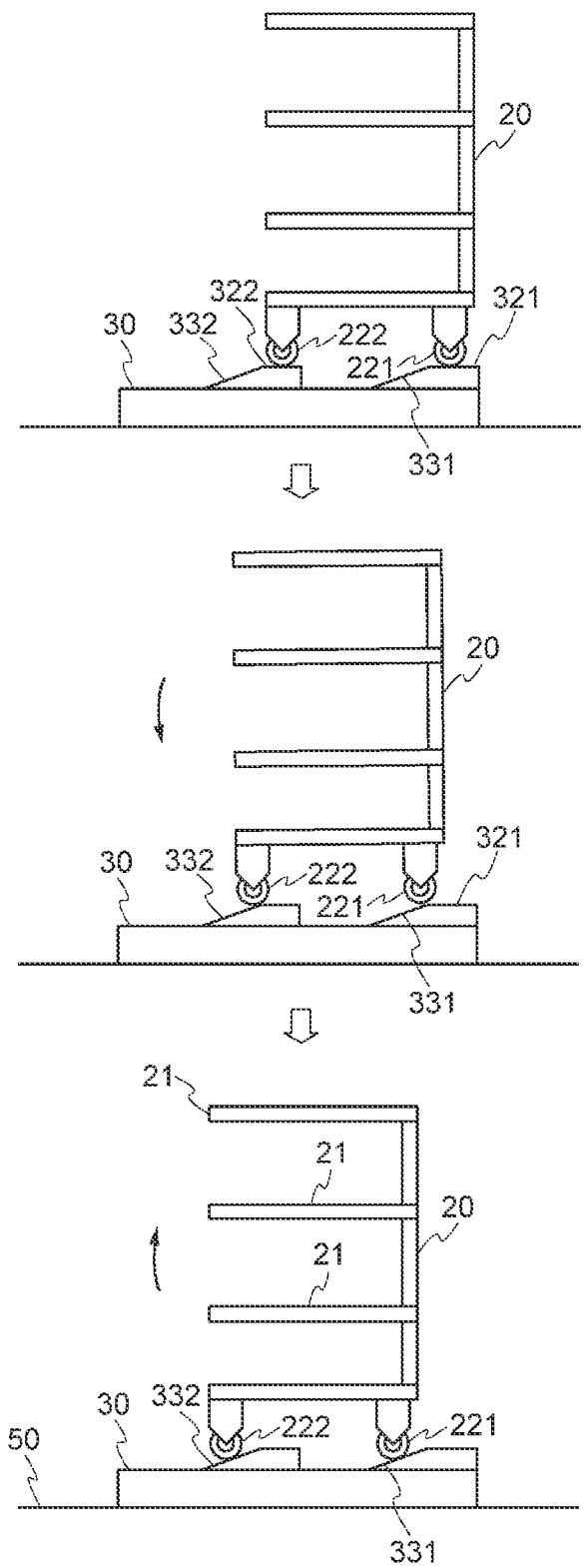
FIG. 27 is a diagram showing states in which a cart according to the sixth embodiment of the present disclosure goes down ramps of the platforms.

FIG. 27 shows a diagram showing states in which the cart 20, in which a first pair of wheels is disposed on the first upper-side surfaces 321 and a second pair of wheels is disposed on the second upper-side surfaces 322, goes down the ramps 331 and 332 of each of the platforms 30. When the cart 20 is pushed toward the ramps 331 and 332, the second pair of wheels starts to go down the ramps 332. At this point, the first pair of wheels is disposed on the first upper-side surfaces 321. Therefore, the cart 20 is postured so that the second wheel pair side of the cart 20 is inclined downward.

After that, the first pair of wheels starts to go down the ramps 331. As described above, since the center of gravity of the cart 20 is located on the first wheel pair side, the posture of the cart 20 returns to its original posture, and the support parts 21 becomes substantially horizontal with respect to the installation surface 50 (i.e., parallel to the installation surface 50). In this way, it is possible to stabilize the posture of the cart 20 when it goes down the ramps of each of the platforms 30.

Another conceivable method for stabilizing the posture of the cart 20 when it goes down the ramps of each of the platforms 30 is to increase the distance between the first pair of wheels and the second pair of wheels. However, this method has a problem that the cart 20 becomes bulky and cannot be efficiently stored. Further, another conceivable method is to dispose a heavy object near the second pair of wheels of the cart 20 and thereby to shift the position of the center of gravity of the cart 20 toward the center between the first pair of wheels and the second pair of wheels. However, this method has a problem that the load is increased when the AGV 10 pushes up the cart 20. According to the sixth embodiment, it is possible to stabilize the posture of the cart 20 when it goes down the ramps of each of the platforms 30 without causing any of the above-described problems.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance system comprising:
an automatic guided vehicle configured to convey a plurality of containers;
at least one cart configured to support the containers; and
two platforms each of which includes at least one ramp on which the cart travels, wherein
the cart is further configured to, by a force applied from the automatic guided vehicle, climb up the ramp, and lift and support the containers placed on the automatic guided vehicle.

2. The conveyance system according to claim 1, wherein the cart includes a support part configured to support a lateral end of the containers, wherein
each of the platforms includes a lower-side surface continuous with a lower end of the ramp, and
a height of the ramp is larger than a distance between a lower surface of the lateral end of the containers placed on the automatic guided vehicle and a corresponding support part of the cart disposed on the lower-side surface.

3. The conveyance system according to claim 1, wherein the cart includes a placement surface on which the containers is disposed,
each of the platforms includes a lower-side surface continuous with a lower end of the ramp, and
a height of the ramp is larger than a distance between a lower surface of the containers supported by the automatic guided vehicle and a corresponding placement surface of the cart disposed on the lower-side surface.

4. The conveyance system according to claim 1, wherein each of the platforms includes an upper-side surface continuous with an upper end of the ramp, and
a length of the upper-side surface in a direction in which the automatic guided vehicle and the cart move is equal to or longer than a sum of a braking distance of the automatic guided vehicle and an error in a stopping position of the automatic guided vehicle.

5. The conveyance system according to claim 1, wherein the automatic guided vehicle includes a first engagement part,
the cart includes a second engagement part corresponding to the first engagement part of the automatic guided vehicle,
each of the platforms includes an upper-side surface continuous with an upper end of the ramp,
the first and second engagement parts are configured to engage with each other in a state in which the cart is disposed on the upper-side surface, and
the automatic guided vehicle is configured to move the cart supporting the containers from the upper-side surface to the ramp by applying a force to the cart through engagement of the first and second engagement parts, and thereby to collect the containers from the cart.

6. The conveyance system according to claim 1, wherein a plurality of carts are arranged on each of the platforms.

7. The conveyance system according to claim 6, wherein each of the platforms is configured so that the carts can move in a direction perpendicular to a direction in which the carts are arranged.

8. The conveyance system according to claim 6, wherein the each of the platforms includes:
a lower-side surface corresponding to an upper surface of the each of platforms;
a first ramp continuous with the lower-side surface and extending upward therefrom;
an upper-side surface continuous with an upper end of the first ramp; and
a second ramp continuous with the upper-side surface and extending downward therefrom, and
the plurality of carts are arranged on the second ramp.

9. The conveyance system according to claim 6, wherein the conveyance system further includes a stopper configured to restrict movements of the carts arranged on each of the platforms.

10. The conveyance system according to claim 1, wherein the cart includes a first guide by which a central axis of the cart is aligned with a central axis of the automatic guided vehicle in a longitudinal direction of the platforms.

11. The conveyance system according to claim 1, further comprising a second guide by which a central axis of the cart in the longitudinal direction of the platforms is aligned with a central axis of the platforms in a longitudinal direction thereof located between the two platforms.

12. The conveyance system according to claim 1, wherein the cart includes:
a first pair of wheels;
a second pair of wheels; and
a vertical support part configured to support the support part supporting the lateral end of the containers on a side of the cart on which the first pair of wheels is disposed,
each of the platforms includes a first upper-side surface continuous with an upper end of the ramp on which the first pair of wheels runs, and a second upper-side surface continuous with an upper end of the ramp on which the second pair of wheels runs, and
a length of the first upper-side surface of the each of platforms in a longitudinal direction thereof is longer than a length of the second upper-side surface of each of the platforms in the longitudinal direction thereof.

* * * * *